(12) United States Patent
Schenk

(10) Patent No.: US 6,608,532 B2
(45) Date of Patent: Aug. 19, 2003

(54) CIRCUIT CONFIGURATION FOR PRODUCING A QUADRATURE-AMPLITUDE-MODULATED TRANSMISSION SIGNAL

(75) Inventor: Heinrich Schenk, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/951,240

(22) Filed: Sep. 12, 2001

(65) Prior Publication Data

US 2002/0067218 A1 Jun. 6, 2002

Related U.S. Application Data

(63) Continuation of application No. PCT/DE01/00041, filed on Jan. 9, 2001.

(30) Foreign Application Priority Data

Jan. 12, 2000 (DE) .......................... 100 00 958

(51) Int. Cl.[7] ............................. H03C 3/00; H04L 27/20
(52) U.S. Cl. .................... 332/103; 375/298; 375/350; 375/261
(58) Field of Search .................... 332/103; 375/298, 375/350, 261; 708/319

(56) References Cited

U.S. PATENT DOCUMENTS 5,412,352 A   5/1995   Graham

FOREIGN PATENT DOCUMENTS

DE   199 39 588 A1   3/2001
EP   0 693 844 A2    1/1996

OTHER PUBLICATIONS

Shirato et al.: "A High Capacity Fully Digitalized Modulator for Digital Radios", IEEE, dated Dec. 6, 1992, pp. 1870–1974;.

Samueli et al.: A VLSI Architecture for a High–Speed All–Digital Quadrature Modulator and Demodulator for Digital Radio Applications, IEEE, vol. 8, No. 8, dated Oct. 1990, pp. 1512–1519.

Haas et al.: "Digital High Speed Modem Using Only a Few Standard Components", IEEE, dated Jun. 1983, pp. 197–201;.

*Primary Examiner*—Arnold Kinkead
(74) *Attorney, Agent, or Firm*—Laurence A. Greenberg; Werner H. Stemer; Ralph E. Locher

(57) ABSTRACT

A circuit configuration for a QAM transmitter contains a Cordic for converting the baseband signal to the radio frequency band. The complex output signal from the Cordic is converted to the carrier frequency by interpolation filters. Different signal paths can be selected for a lower and an upper frequency band for the carrier signal. The signal paths each use identical filter parts. Therefore, the circuit need be operated at only half the sampling rate of the output signal as far as a multiplexer on the output side.

10 Claims, 6 Drawing Sheets

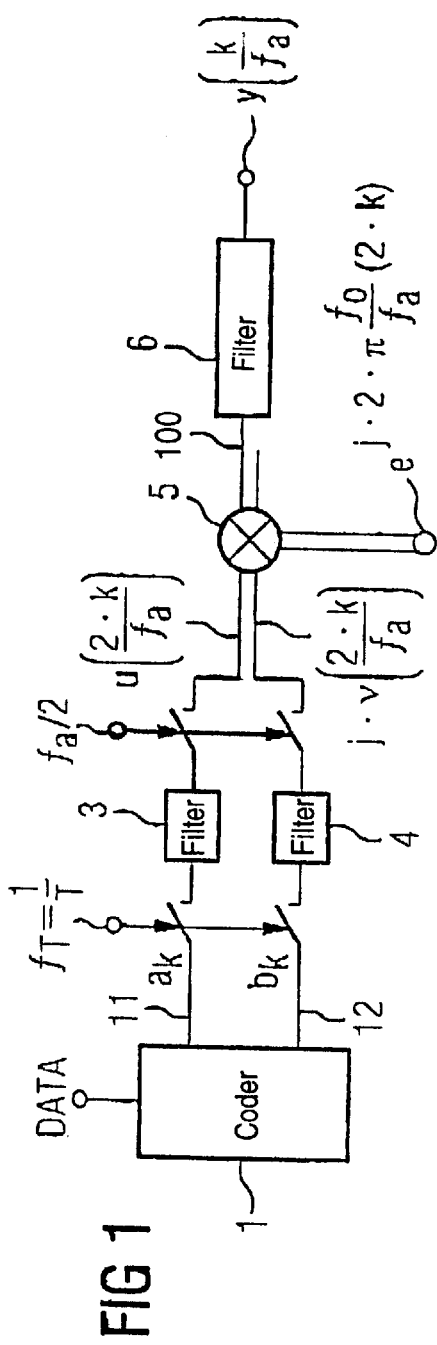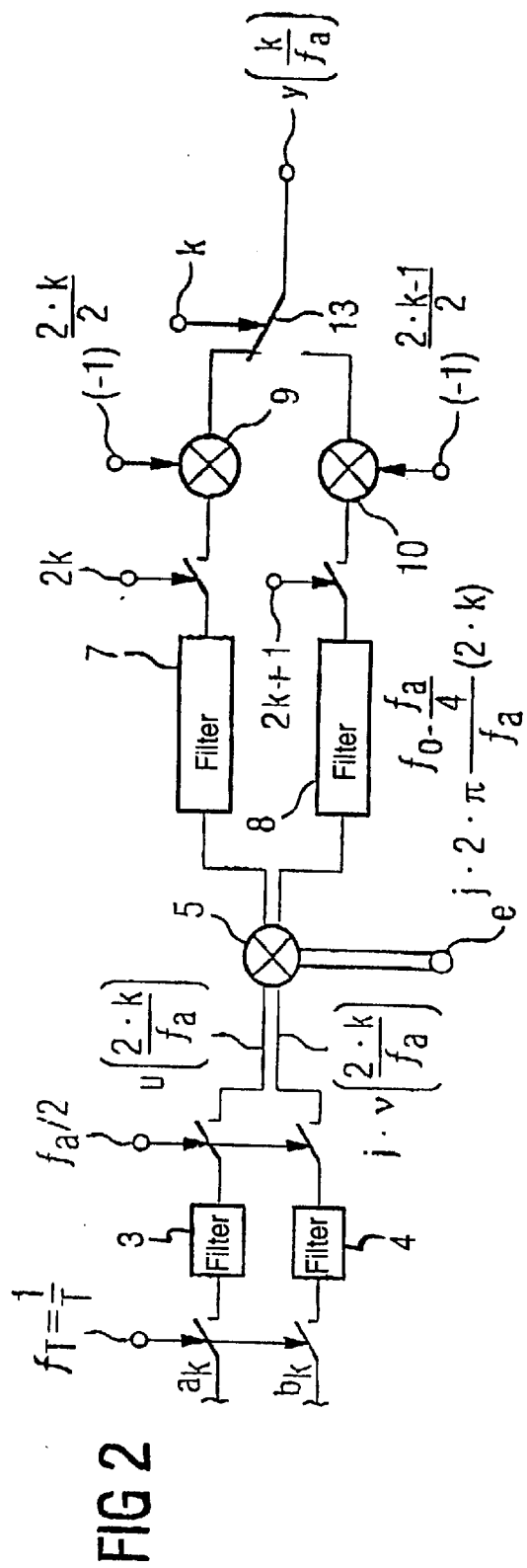
FIG 1
FIG 2

CIRCUIT CONFIGURATION FOR PRODUCING A QUADRATURE-AMPLITUDE-MODULATED TRANSMISSION SIGNAL

CROSS-REFERENCE TO RELATED APPLICATION

This application is a continuation of copending International Application No. PCT/DE01/00041, filed Jan. 9, 2001, which designated the United States.

BACKGROUND OF THE INVENTION

Field of the Invention

The invention relates to a circuit configuration for producing a quadrature-amplitude-modulated transmission signal, which contains a coder to an input side of which a digital user signal can be supplied and which, on an output side has a respective connection for a real part and for an imaginary part of a quadrature-amplitude-modulated signal that is to be transmitted. The circuit further has a device for digital conversion of the signal to be transmitted to a radio-frequency band, with a connection for the real part and the imaginary part, and a connection for a transmission system, which contains samples derived at an output frequency.

Such a circuit configuration for quadrature-amplitude-modulated (QAM) signals is disclosed in Published, Non-Prosecuted German Patent Application DE 199 39 588 A. The transmission configuration is, for example, used in a cable modem in order to send signals in a back channel from the terminal via the broadband cable network. A QAM transmitter is required to be able to produce QAM-modulated signals and carrier frequencies in the range from about 5 MHz to 65 MHz. Owing to the required carrier frequency accuracy, direct digital conversion to the final frequency band without any prior analog conversion, as is carried out by the known QAM transmitter, is not feasible. The transmitter contains a coder, which produces samples for the real part and the imaginary part of the signal to be transmitted in the baseband signal. Following subsequent low-pass filtering of the signal components, the conversion to the carrier frequency is carried out by a Cordic calculation unit (Cordic).

The maximum carrier frequency for a QAM transmission signal is 65 MHz. In order to satisfy the sampling theorem, a clock frequency of about 200 MHz is required in practice. In the circuit configuration described in Non-Prosecuted, German Patent Application DE 199 39 588 A, the low-pass filter and the Cordic are thus operated at 200 MHz. The circuit complexity for implementation is correspondingly complicated.

U.S. Pat. No. 5,412,352 discloses a circuit configuration for broadband RF transmission, by which direct digital conversion to the radio-frequency band is possible. The circuit contains a digital mixer and a variable oscillator, which contains a digital sine and cosine generator. The digital filtering is carried out in two stages. The first stage contains a non-recursive filter, and the second stage contains a specific interpolation filter. This results in the production of a narrowband-filtered signal.

SUMMARY OF THE INVENTION

It is accordingly an object of the invention to provide a circuit configuration for producing a quadrature-amplitude-modulated transmission signal that overcomes the above-mentioned disadvantages of the prior art devices of this general type, which can be produced with relatively little circuit complexity.

With the foregoing and other objects in view there is provided, in accordance with the invention, a circuit configuration for producing a quadrature-amplitude-modulated transmission signal. The circuit configuration contains a coder having an input for receiving a digital user signal and outputs for outputting a real part and an imaginary part of a quadrature-amplitude-modulated (QAM) signal to be transmitted. A device for digital conversion of the QAM signal to be transmitted to a radio-frequency band, is provided. The device is connected to the coder and has a first input for receiving the real part and a second input for receiving the imaginary part of the QAM signal. The device has a first output for outputting the real part and a second output for outputting the imaginary part. A first interpolation filter is connected to the first output of the device for receiving the real part, a second interpolation filter is connected to the first output of the device for receiving the real part, and a third interpolation filter is provided for receiving the imaginary part. A multiplexer is connected to the second interpolation filter and to the third interpolation filter to switch between the second interpolation filter and the third interpolation filter at an output frequency. A terminal is connected to the multiplexer and at which the QAM signal may be tapped off, the QAM signal contains sample values sampled at the output frequency. A switching device is connected to the device, the first interpolation filter, the second interpolation filter and the third interpolation filter. In a first setting of the switching device the first interpolation filter is connected to the first output for the real part of the device, and in a second setting of the switching device the second interpolation filter is connected to the first output for the real part of the device and the third interpolation filter is connected to the second output for the imaginary part of the device. The switching device is controllable in dependence on the output frequency.

By use of additional circuit complexity in the form of interpolation filters, a multiplexer and a switching device, the invention results in the majority of the circuit running at half the output clock frequency $f_a$ of 200 MHz. Only the multiplexer on the output side is operated at the clock frequency of 200 MHz, which is required in practice on the basis of the sampling theorem. The circuits can thus be configured using conventional circuit techniques. The complexity required by virtue of the circuit parts that are also required according to the invention is thus more than compensated for.

In the circuit configuration according to the invention, a distinction is drawn between two bands for the carrier frequency that is to be produced. There is a lower frequency band between 5 MHz and a frequency $f_1$, and a higher frequency band between $f_1$ and 65 MHz. The frequency $f_1$ occurs at about 20 MHz to 30 MHz. The frequency $f_1$ is expediently chosen to be $f_a/8$, where $f_a$ is the sampling frequency of the transmitted signal. Different signal paths are provided for the low frequency band and the high frequency band. Components can be used jointly, if the filters are partitioned appropriately. The QAM transmitter then contain two interpolation filter parts, which are connected downstream from the output for the real part and the imaginary part of the Cordic, and between which, on the output side, switching is carried out by the multiplexer and the sampling frequency of 200 MHz, with switching on the input side being dependent on the selected carrier frequency band.

In accordance with an added feature of the invention, the first interpolation filter has a first filter part and a second filter part connected in parallel on an input side and are each coupled on an output side to the multiplexer. The first filter part of the first interpolation filter and the second interpolation filter have an identical configuration. The second filter part of the first interpolation filter and the third interpolation filter have an identical configuration.

In accordance with an added feature of the invention, the first filter part is connected to the first output for the real part of the device. The switching device has a first changeover switch, by which the second filter part is connected, in the first setting, to the first output for the real part of the device and, in the second setting, is connected to the second output for the imaginary part of the device for digital conversion.

In accordance with an additional feature of the invention, a first mathematical sign inverting device for changing a mathematical sign is connected between the second interpolation filter and the multiplexer. A second mathematical sign inverting device for changing a mathematical sign is connected between the third interpolation filter and the multiplexer.

In accordance with another feature of the invention, the first filter part has an output and the second filter part has an output. The switching device has a second changeover switch that, in the first setting, is connected to the output of the first filter part and, in the second setting, is connected to the first mathematical sign inverting devices. The switching device also has a third changeover switch which, in the first setting, is connected to the output of the second filter part and, in the second setting, is connected to the second mathematical sign inverting device.

In accordance with a further feature of the invention, the multiplexer has inputs, and the second changeover switch and the third changeover switch are connected to the inputs of the multiplexer.

In accordance with a further added feature of the invention, there are provided low-pass filters, one of the low-pass filters is connected downstream from each of the outputs of the coder.

In accordance with a further additional feature of the invention, the device for digital conversion is a Cordic.

In accordance with another further feature of the invention, the first filter part, the second filter part, the low-pass filters and the Cordic process samples at a reduced frequency which is less than the output frequency, and in that the reduced frequency is half the output frequency.

In accordance with a concomitant feature of the invention, the switching device is controlled by the output frequency in such a manner that the first setting is selected when the output frequency is low, and the second setting is selected when the output frequency is higher than this.

Other features which are considered as characteristic for the invention are set forth in the appended claims.

Although the invention is illustrated and described herein as embodied in a circuit configuration for producing a quadrature-amplitude-modulated transmission signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. Mutually corresponding components are provided with the same reference symbols.

BRIEF DESCRIPTION OF THE DRAWINGS

FIG. 1 is a block diagram of a QAM transmitter at a low carrier frequency between 5 MHz and $f_1$ according to the invention;

FIG. 2 is a block diagram of the QAM transmitter at a high carrier frequency between $f_1$ and 65 MHz;

DESCRIPTION OF THE PREFERRED EMBODIMENTS

Figure 3:
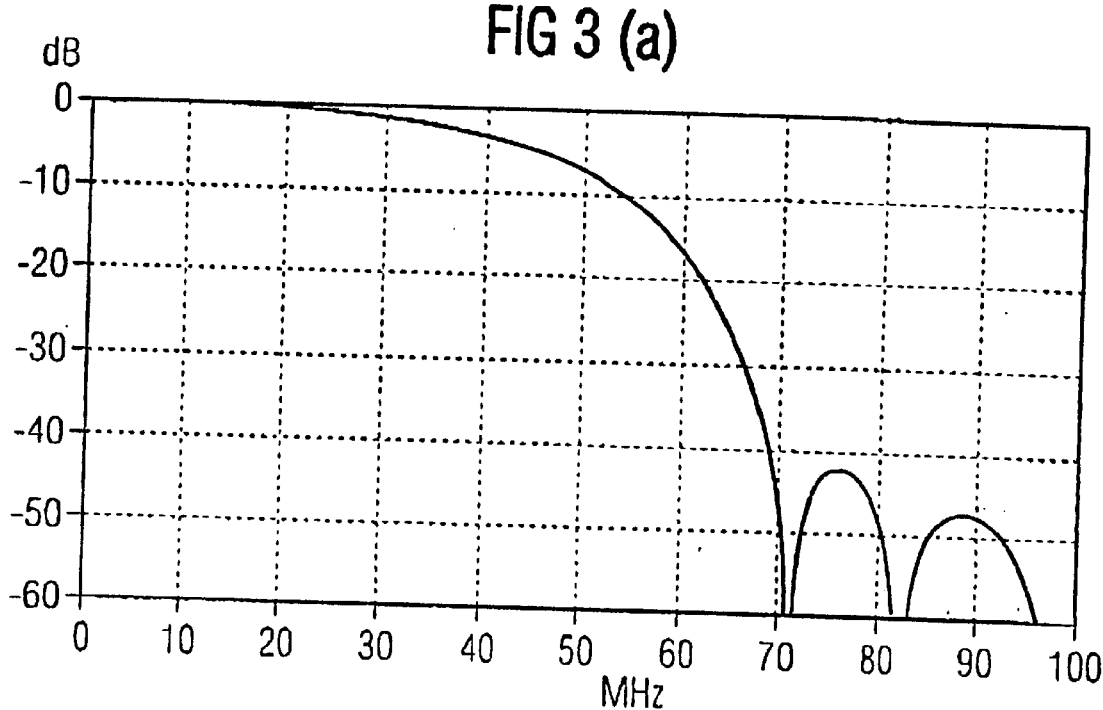
FIGS. 3(a) and 3(b) are graphs showing attenuation profiles for two transfer functions, which have been chosen by way of example, for interpolation filters.
Figure 3:
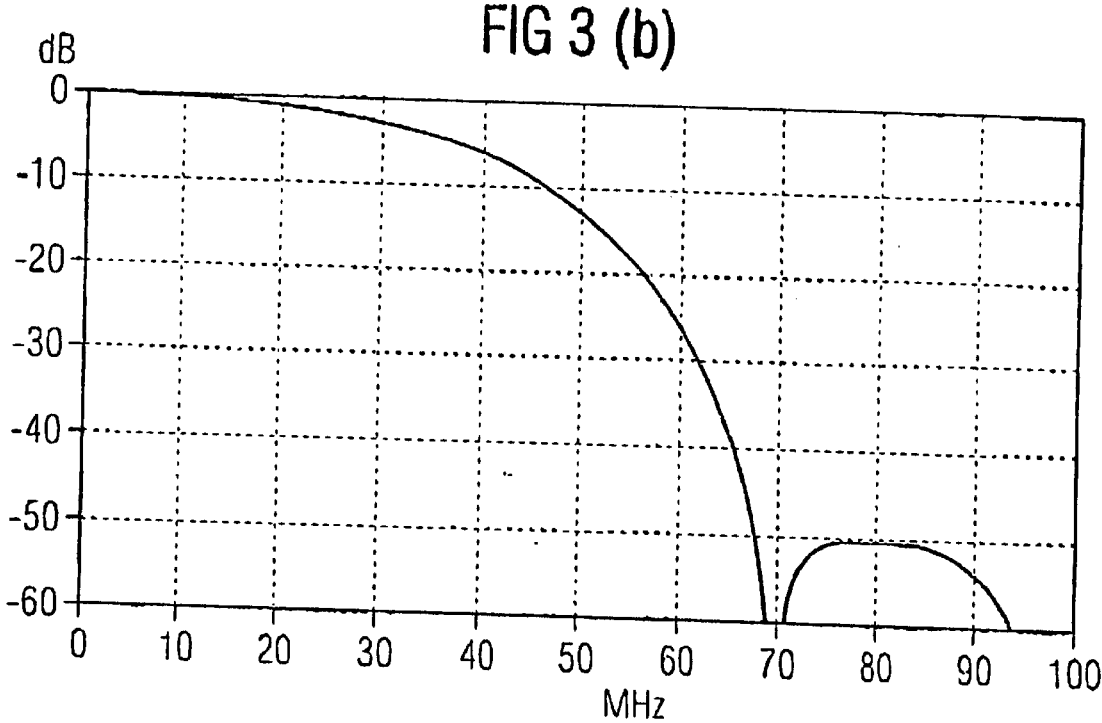

In all the figures of the drawing, sub-features and integral parts that correspond to one another bear the same reference symbol in each case. Referring now to the figures of the drawing in detail and first, particularly, to FIG. 1 thereof, there is shown a transmission configuration containing a coder 1 to which a digital data signal DATA is supplied. QAM-modulated symbols are produced at a frequency $f_T$ at output-side connections 11, 12 of the coder 1. A real part of the symbols is produced at the connection 11, and an imaginary part at the connection 12. The real part and imaginary part are fed into respective low-pass filters 3, 4. The filtered real and imaginary parts are produced on an output side of the low-pass filters 3, 4 as samples at a symbol frequency $f_a/2$, where $f_a$ is a sampling frequency for a transmission signal of 200 MHz, as required by the sampling theorem. The sampled real and imaginary parts are supplied to a Cordic 5, which converts them to the radio frequency band. The Cordic 5 is supplied with samples from a phase shifting operator for this purpose. The signal, converted to the radio frequency band, is produced at the output of the Cordic 5 as a complex value in the form of a real part and an imaginary part. In the configuration shown in FIG. 1 for frequencies from 5 MHz to $f_1$, only the real part at a connection 100 is processed further by an interpolation filter 6. The transmission signal is produced at the transmission sampling frequency of 200 MHz at the output of the interpolation filter 6. The circuit parts located upstream in the signal path process the samples at half the transmission sampling rate of $f_a/2=100$ MHz.

The transmission signal is accordingly generated using a circuit comparable to that in the Published, Non-Prosecuted German Patent Application 199 39 588 A. However, the sampling frequency is halved. The multiplication by the phase-shifting operator corresponds to the Cordic block in the cited application. Since, in the low carrier frequency band, the sampling theorem is not contravened by choosing the sampling frequency to be $f_a/2$ at about 100 MHz, the transmission signal can be generated at the desired sampling frequency $f_a$ using the interpolation filter. Only the real part at the output of the Cordic 5 is processed further by the interpolation filter 6.

The circuit in FIG. 2, which is suitable for the high frequencies from $f_1$ to 65 MHz, in each case has an interpolation filter 7, 8, connected to the Cordic block 5.

The samples on an output side of the interpolation filters 7, 8 have a time offset. The mathematical signs are alternated in a mathematical sign inverting device 9, 10. A multiplexer 13 on the output side switches at the carrier frequency $f_a$ between the signal path for the real part and that for the imaginary part, so that samples at the carrier frequency $f_a$ are produced on the output side. The significant feature in this case is likewise only that the multiplexer 13 is operated at the frequency $f_a$. The circuit parts located upstream in the signal path may be operated at only half the sampling frequency $f_a/2$, that is to say about 100 MHz.

The complex multiplication in the Cordic 5 is carried out at the reduced carrier frequency of $f_a/4$. The carrier frequencies in the first modulation stage are then in the range from $f_1-f_a/4$ to 65 MHz$-f_a/4$. For a sampling frequency of $f_a=200$ MHz, the frequency $f_1$ is 25 MHz, and the frequency $f_a/4$ is 50 MHz. The carrier frequencies in the first stage are thus in the range from −25 MHz to 15 MHz. The signal after the first modulation stage can thus be produced at half the sampling frequency. A second modulation stage in the form of the mathematical sign inverting devices 9 and 10 operates at the output-side sampling frequency of $f_a$ at about 200 MHz, as a result of which the frequency of the signal produced in the first modulation stage 5 is shifted to $f_a/4$. This corresponds to multiplication of the complex signal after the first stage 5 by 1, j, −1, −j, 1, j, . . . The real part and the imaginary part of the first modulation stage therefore from then on need be processed at only half the sampling frequency. The samples are converted to the correct time sampling phase in advance by the two interpolation filters 7, 8.

The specific transfer function $$H_1(z) = \tfrac{1}{32}(1 - 4z^2 + z^3 + 20z^4 + 32z^5 + 20z^6 + z^7 - 4z^8 + z^{10})$$

is used in the following text for the interpolation filters 7, 8. The attenuation profile of the interpolation filter whose transfer function is $H_1(z)$ is shown in FIG. 3(a). The minimum attenuation above 70 MHz for the interpolation filter is about 42 dB.

Figure 4:
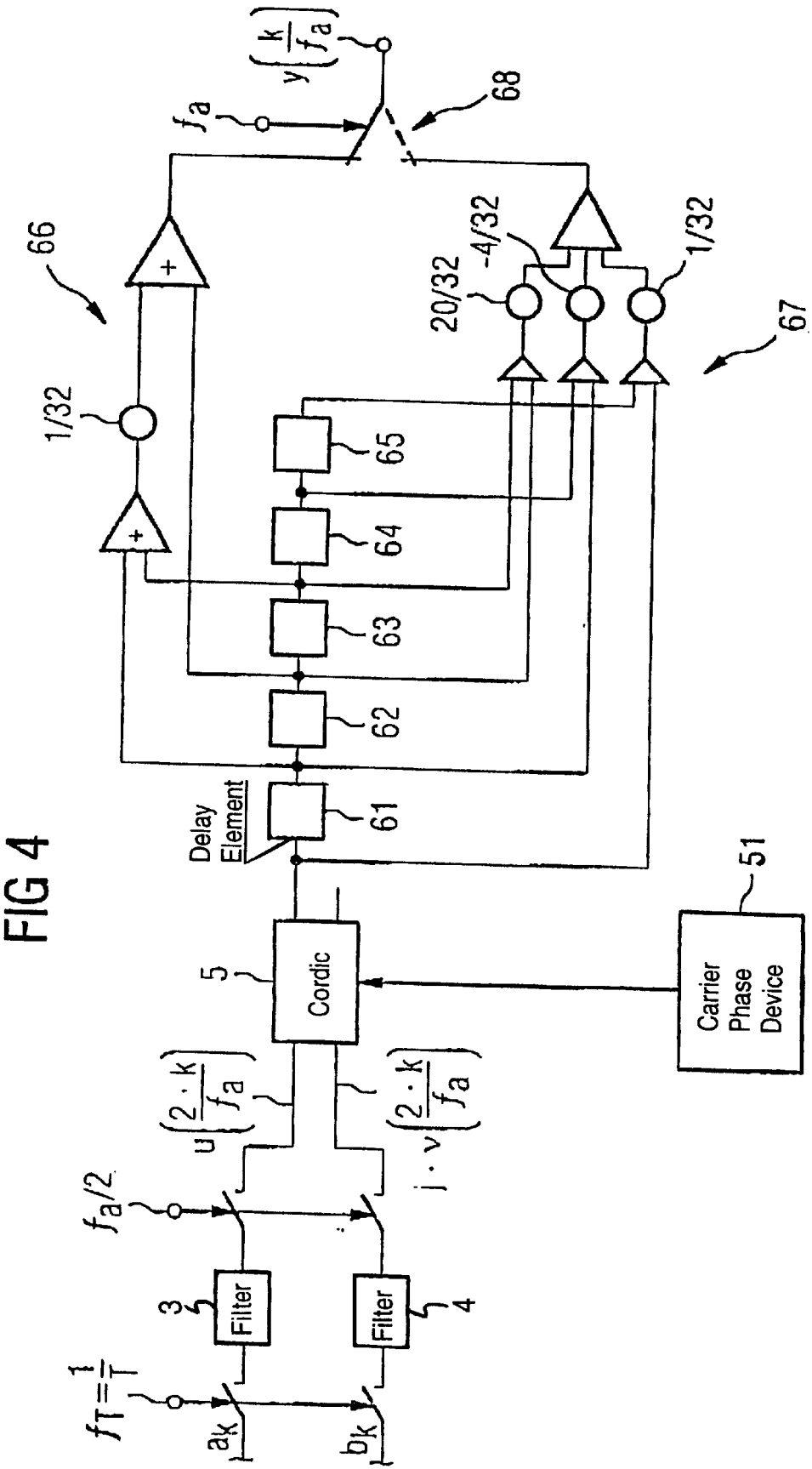
FIG. 4 is a block diagram of the QAM transmitter for the low carrier frequency band with a first transfer function for the interpolation filter.

The block diagram shown in FIG. 4 applies to the low frequency band from 5 MHz to $f_1$. A filter input is connected to the output for the real part from the Cordic 5. The filter 6 contains a chain of series-connected delay elements 61, 62, 63, 64, 65. The filter 6 has an upper 66 and a lower branch 67, by which the signal values are added and are weighted by a factor. A multiplexer 68, which runs at the full sampling rate of $f_a=200$ MHz, is used to switch between the upper branch 66 and the lower branch 67.

Figure 5:
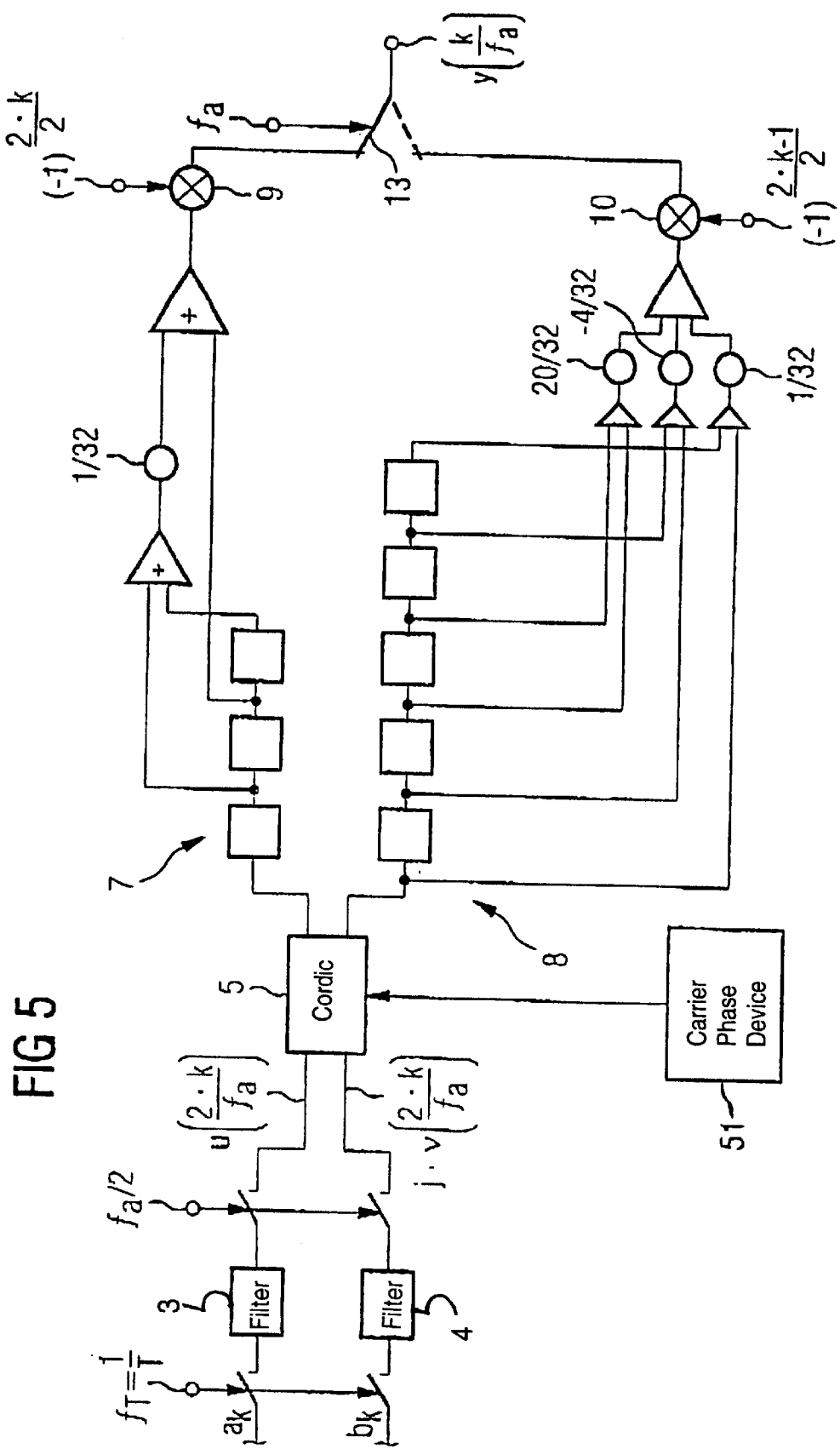
FIG. 5 is a block diagram of the QAM transmitter for the high frequency band with the transfer function.

The block diagram for the QAM transmitter for the upper carrier frequency band from $f_1$ to 65 MHz is shown in FIG. 5. The two interpolation filters 7, 8 are connected to the outputs for the real part and the imaginary part from the Cordic 5. This results in corresponding simplifications. It can be seen that the filter 7 corresponds to the upper branch 66 of the circuit in FIG. 4, and the filter 8 corresponds to the lower branch 67 of the circuit in FIG. 4. The filters 7, 8 are followed on the output side by the mathematical sign inverting devices 9, 10.

In the circuit shown in FIG. 5, both outputs of the Cordic block 5 are required for further processing. The interpolation filter 7 for the real part calculates the real part values at the time $2k/f_a$, and the interpolation filter 8 for the imaginary part calculates the imaginary part values for the time $2(k-1)/f_a$. The subsequent alternate multiplication by +1 and −1 changes the signal spectrum that is produced to the desired carrier frequency band. The transmission signal at the frequency $f_a=200$ MHz is obtained by alternately passing on the samples from the mathematical sign inverting devices 9, 10. When generating the carrier phase in the Cordic block 5, the frequency shift by $f_a/4$ must be taken into account. A corresponding carrier phase is produced in a device 51, and is supplied to the Cordic 5.

Figure 6:
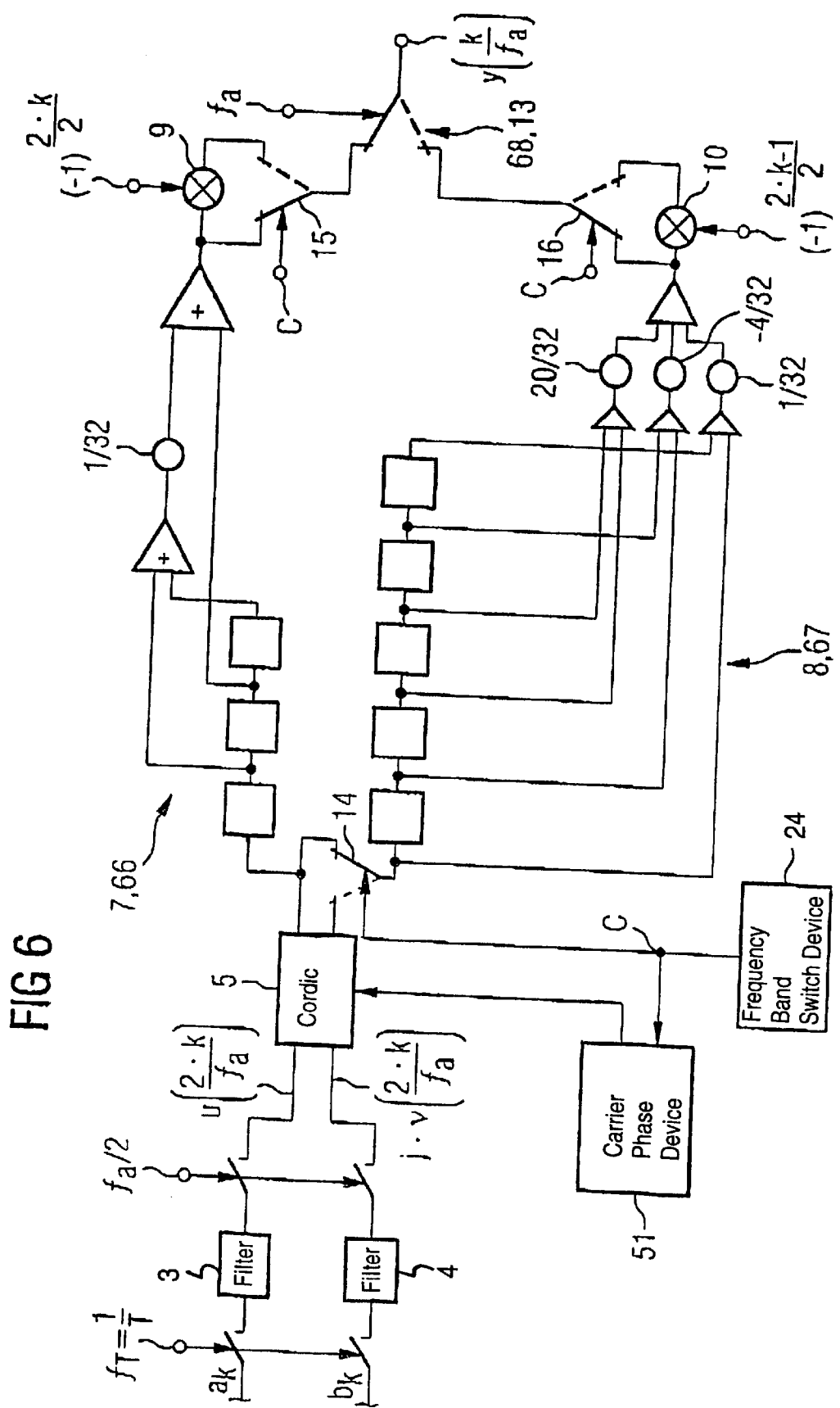
FIG. 6 is a block diagram of the entire QAM transmitter with the transfer function.

A combined circuit, which processes both the frequency bands 5 MHz to $f_1$ and $f_1$ to 65 MHz is shown in FIG. 6. A control signal C is provided by a device 24 for frequency band switching, which indicates whether the transmission signal is in the lower or upper frequency band. There are two filter parts 7, 66 and 8, 67, which correspond to one another. The upper filter part 66 for the low frequency and the interpolation filter 7 for the real part for the high frequencies are connected to the real part output of the Cordic 5. The lower filter part 67 for the low frequency and the interpolation filter 8 for the imaginary part for the high frequencies are connected to the imaginary part output of the Cordic 5. A changeover switch 14 is controlled by the frequency band signal C and, in the low carrier frequency band, connects the output for the real part of the Cordic 5 to the filtered branch 8, 67. In the high frequency band, the changeover switch 14 connects the lower filter part 8, 67 to the imaginary part output of the Cordic 5. The mathematical sign inverting device 9 or 10 is connected into the signal path at the output of the filter branches, depending on the carrier frequency band. A changeover switch 15 is provided for the branch with the filter part 7, 66, and a changeover switch 16 for the branch with the filter part 8, 67. If the carrier frequency is low, the changeover switches 15, 16 are connected directly to the output of the respective filters 7, 66 or 8, 67. If the carrier frequency is high, the changeover switches 15, 16 are connected to the output of the mathematical sign inverting device 9, 10. The changeover switches 15, 16 once again form the inputs to the multiplexer 68, 13.

The inputs to the filters are thus switched depending on whether the desired carrier frequency band is from 5 MHz to $f_1$ on the one hand, or from $f_1$ to 67 MHz, on the other hand, where $f_1$ is between 25 MHz and 30 MHz. The outputs are likewise connected either directly to the multiplexer 68, 13 or with the interposition of the mathematical sign inverting devices 9, 10, depending on the carrier frequency band. Furthermore, the carrier phase device 51 is controlled by the frequency band signal C. A frequency shift of $f_a/4$ is produced in the upper frequency band.

Figure 7:
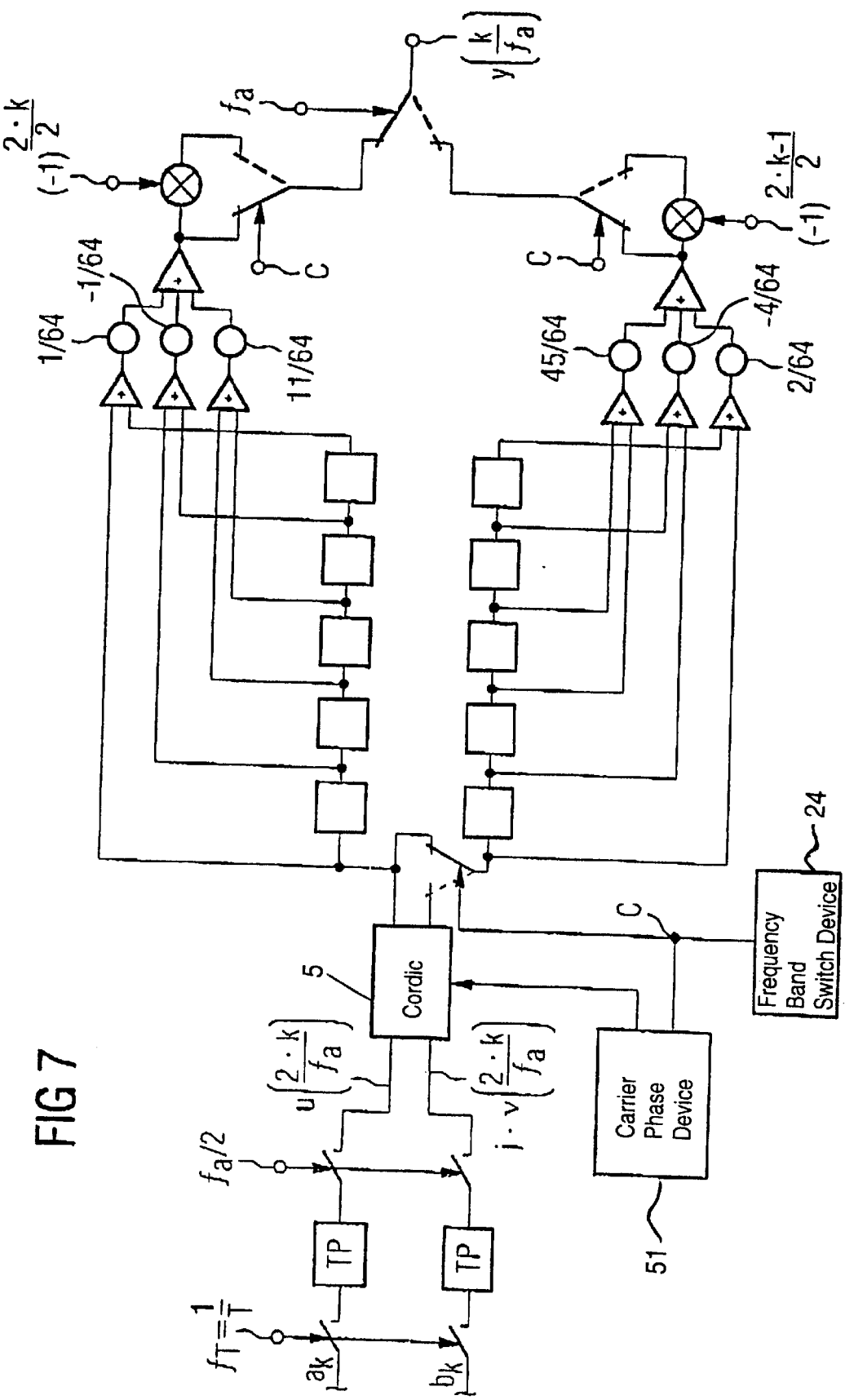
FIG. 7 is a block diagram of the QAM transmitter with a second transfer function for the interpolation filter.

FIG. 7 shows a combined circuit, which is comparable to that of FIG. 6, for the QAM transmitter, which, in contrast to this, uses interpolation filters with a different transfer function:

$$H_2(z) = \tfrac{1}{64}(1 + 2z^{-1} - z^{-2} - 4z^{-3} + 11z^{-4} + 45z^{-5} + 64z^{-6} + 45z^{-7} + 11z^{-8} - 4z^{-9} - z^{-10} + 2z^{-11} + z^{-12})$$

The attenuation profile of the interpolation filter whose transfer function is $H_2(z)$ is shown in FIG. 3(b). In contrast to the attenuation profile for the transfer function $H_1(z)$, the minimum attenuation above 70 MHz is approximately 51 dB. Therefore, the undesirable mirror spectra are suppressed to a greater extent. The circuit in FIG. 7 has a corresponding construction to that of the circuit in FIG. 6.

I claim:

1. A circuit configuration for producing a quadrature-amplitude-modulated transmission signal, comprising:
   a coder having an input for receiving a digital user signal and outputs for outputting a real part and an imaginary part of a quadrature-amplitude-modulated (QAM) signal to be transmitted;
   a device for digital conversion of the QAM signal to be transmitted to a radio-frequency band, said device connected to said coder and having a first input for receiving the real part and a second input for receiving the imaginary part of the QAM signal, said device having a first output for outputting the real part and a second output for outputting the imaginary part;

a first interpolation filter connected to said first output of said device for receiving the real part;

a second interpolation filter connected to said first output of said device for receiving the real part;

a third interpolation filter for receiving the imaginary part;

a multiplexer connected to said second interpolation filter and said third interpolation filter to switch between said second interpolation filter and said third interpolation filter at an output frequency;

a terminal connected to said multiplexer and at which the QAM signal may be tapped off, the QAM signal containing sample values sampled at the output frequency; and a switching device connected to said device, said first interpolation filter, said second interpolation filter and said third interpolation filter, in a first setting of said switching device said first interpolation filter connected to said first output for the real part of said device, and in a second setting of said switching device said second interpolation filter connected to said first output for the real part of said device and said third interpolation filter connected to said second output for the imaginary part of said device, said switching device being controllable in dependence on the output frequency.

2. The circuit configuration according to claim 1, wherein said first interpolation filter has a first filter part and a second filter part connected in parallel on an input side and are each coupled on an output side to said multiplexer, said first filter part of said first interpolation filter and said second interpolation filter have an identical configuration, and said second filter part of said first interpolation filter and said third interpolation filter have an identical configuration.

3. The circuit configuration according to claim 2, wherein:

said first filter part is connected to said first output for the real part of said device; and said switching device has a first changeover switch, by which said second filter part is connected, in the first setting, to said first output for the real part of the device and, in the second setting, is connected to said second output for the imaginary part of said device for digital conversion.

4. The circuit configuration according to claim 3, including:

a first mathematical sign inverting device for changing a mathematical sign is connected between said second interpolation filter and said multiplexer; and a second mathematical sign inverting device for changing a mathematical sign is connected between said third interpolation filter and said multiplexer.

5. The circuit configuration according to claim 4, wherein:

said first filter part has an output and said second filter part has an output;

said switching device has a second changeover switch which, in the first setting, is connected to said output of said first filter part and, in the second setting, is connected to said first mathematical sign inverting device; and said switching device has a third changeover switch which, in the first setting, is connected to said output of said second filter part and, in the second setting, is connected to said second mathematical sign inverting device.

6. The circuit configuration according to claim 5, wherein said multiplexer has inputs, and said second changeover switch and said third changeover switch are connected to said inputs of said multiplexer.

7. The circuit configuration according to claim 6, including low-pass filters, one of said low-pass filters connected downstream from each of said outputs of said coder.

8. The circuit configuration according to claim 7, wherein said device for digital conversion is a Cordic.

9. The circuit configuration according to claim 8, wherein said first filter part, said second filter part, said low-pass filters and said Cordic process samples at a reduced frequency which is less than the output frequency, and in that the reduced frequency is half the output frequency.

10. The circuit configuration according to claim 1, wherein said switching device is controlled by the output frequency in such a manner that the first setting is selected when the output frequency is low, and the second setting is selected when the output frequency is higher than this.

* * * * *